(12) United States Patent
Sarh (10) Patent No.: US 7,410,352 B2
(45) Date of Patent: Aug. 12, 2008

(54) MULTI-RING SYSTEM FOR FUSELAGE BARREL FORMATION

(75) Inventor: Branko Sarh, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 118 days.

(21) Appl. No.: 10/907,729

(22) Filed: Apr. 13, 2005

(65) Prior Publication Data

US 2006/0231682 A1  Oct. 19, 2006

(51) Int. Cl.
*B29C 41/00* (2006.01)
*B29C 67/00* (2006.01)
*B28B 7/28* (2006.01)

(52) U.S. Cl. ............... 425/317; 425/403; 425/393; 425/470; 249/184

(58) Field of Classification Search ............. 249/144, 249/190, 180, 146, 184; 425/108, 393, 403, 425/317, 470; 73/802
See application file for complete search history.

(56) References Cited

U.S. PATENT DOCUMENTS

| | | | | |
|---|---|---|---|---|
| 4,512,837 A | * | 4/1985 | Sarh et al. | 156/189 |
| 4,524,556 A | * | 6/1985 | Sarh et al. | 52/793.11 |
| 4,557,090 A | * | 12/1985 | Keller, Sr. | 52/245 |
| 4,633,632 A | | 1/1987 | Sarh | |
| 4,717,330 A | * | 1/1988 | Sarh | 425/403 |
| 4,725,334 A | | 2/1988 | Brimm | |
| 5,223,067 A | * | 6/1993 | Hamamoto et al. | 156/173 |
| 6,149,851 A | * | 11/2000 | Deckers et al. | 264/219 |
| 6,190,484 B1 | | 2/2001 | Appa | |
| 6,613,258 B1 | | 9/2003 | Maison et al. | |

FOREIGN PATENT DOCUMENTS

| | | |
|---|---|---|
| EP | 0444627 | 9/1991 |
| EP | 1149687 | 10/2001 |

* cited by examiner

*Primary Examiner*—James P Mackey
*Assistant Examiner*—Dimple Bodawala
(74) *Attorney, Agent, or Firm*—Ostrager Chong Flaherty & Broitman P.C.

(57) ABSTRACT

An aircraft fuselage barrel (10) includes a skin (12) and a shear tie (18). The shear tie (18) resides within and is integrally formed with the skin (12). The shear tie (18) is separate from and configured for frame attachment thereon. A multi-ring system (79) for fuselage barrel formation includes a mold (68) with a ring (50). The ring (50) has width ($W_2$) approximately equal to a separation distance (D) between two adjacent fuselage frames (22) and includes a module (52) that has a circumferential length ($L_1$) that is greater than a circumferential distance between two fuselage longerons (14). A support structure (80) is coupled to and supports the mold (68). A method of forming the aircraft fuselage barrel (10) includes constructing the support structure (80). Rings (86) of the mold (68) are attached to and over the support structure (80). The mold (68) is constructed. Material is laid-up onto the mold (68) to integrally form the one-piece fuselage barrel (10) including a Hat-configured longeron (14).

16 Claims, 8 Drawing Sheets

MULTI-RING SYSTEM FOR FUSELAGE BARREL FORMATION

TECHNICAL FIELD

The present invention is related generally to aircraft fuselages. More particularly, the present invention is related to the integral formation of a one-piece aircraft fuselage barrel.

BACKGROUND OF THE INVENTION

The fuselage of a modern aircraft typically includes multiple fuselage barrels that have an outer skin, which is supported by circular frame structures. The frame structures reside within the skin and are positioned in a parallel configuration and at given intervals. The frame structures are attached to the skin via shear ties, which are fastened to the skin. Longerons are integrally formed with the skin and extend between the shear ties to provide increased rigidity and strength. Doublers are also formed with the skin to provide increased strength in doorway and window areas.

A one-piece or 360° integrally formed fuselage barrel can, for example, be in the form of a sandwich structure or in the form of a monolithic structure. The tooling commonly used to form a one-piece fuselage barrel that has a skin, longerons, and doublers, uses a series of large mandrel segments, which are joined to each other in a radial orientation. For example, the tooling for an aircraft fuselage barrel that is approximately 40 feet long may have six mandrel segments that are each 40 ft long and are coupled in series circumferentially. The skin, longerons, and doublers are "laid-up" onto the segments and cured to form the fuselage. After curing, the mandrels are decoupled and removed from the fuselage barrel. The segments are heavy, and difficult to handle and extract from the fuselage barrel. Each fuselage barrel in the aircraft industry typically has its own set of mandrel segments.

Other approaches have been utilized to form a one-piece fuselage barrel. One of these approaches utilizes mandrel segments that are relatively smaller in diameter as compared to the method described above. The mandrel segments are wrapped with an inflatable bag. A sandwiched fuselage barrel structure, including the inner and outer skins, the core, and the doublers, is laid-up onto the bag. Stable cowlings are placed over the sandwiched structure and the bag is inflated to apply an outward pressure on the sandwiched structure and to press the skin against the cowlings. Upon curing of the fuselage barrel the bag is deflated and the mandrel segments are removed. Although this approach somewhat eases the manipulation of the mandrel segments due to reduced diameter and weight of the mandrels, it is generally better suited for sandwich structures and cannot be easily applied to complex monolithic structures.

Another approach utilizes long continuous mandrel segments. Skins, longerons, and doublers are laid-up onto the mandrel segments and cowling plates are applied and pressed thereon. A bag is extended over the exterior of the cowling plates. The bag applies pressure to the cowling plates via a generated vacuum therein. Although this approach allows for the integral formation of the skin, longerons, and doublers, it does not allow for the integration of shear ties and/or frames. In addition, due to the size and weight, this approach also uses mandrel segments that are difficult to handle and extract.

Thus, there exists a need for an improved, simplified, and efficient technique of forming a one-piece aircraft fuselage barrel.

SUMMARY OF THE INVENTION

One embodiment of the present invention provides an aircraft fuselage barrel that includes a skin and a shear tie. The shear tie is positioned within and is integrally formed with the skin. The shear tie is separate from and configured for frame attachment thereon.

Another embodiment of the present invention provides a multi-ring system for fuselage barrel formation. The system includes a mold with a ring. The ring has a width approximately equal to a separation distance between two adjacent frames of a fuselage barrel and includes a module that has a circumferential length that is greater than a circumferential distance between two fuselage longerons. A support structure is coupled to and supports the mold.

Yet another embodiment of the present invention provides a method of forming an aircraft fuselage barrel that includes constructing a support structure. Rings of a mold are attached to and over the support structure. The mold is constructed. Material is laid-up onto the mold to integrally form a one-piece fuselage barrel including a Hat-configured longeron.

The embodiments of the present invention provide several advantages. One such advantage is the provision of a one-piece fuselage barrel including skins, longerons, doublers, and shear ties. This integral formation of a fuselage barrel, as stated, simplifies the manufacturing process of an aircraft fuselage barrel by reducing part count, eliminating the need to separately manufacture shear ties, and eliminating the need to fasten the shear ties to an aircraft fuselage barrel.

Another advantage provided by an embodiment of the present invention, is the provision of a multi-ring mold system for lay-up of fuselage materials. The single multi-ring mold system allows for formation of various fuselage barrels having different lengths. This simplifies the amount of fuselage forming components and reduces the storage requirements associated therewith.

Still another advantage provided by an embodiment of the present invention, is the provision of forming a one-piece integral fuselage barrel having shear ties and not frames. This simplifies the tooling required to form a one-piece fuselage barrel.

Yet another advantage provided by an embodiment of the present invention, is the provision of a mold system having multiple rings. The rings are light and small in size relative to traditional mandrel segments and thus, are easier to handle, manipulate, and extract from a fuselage barrel. The use of the rings and the modules increases design flexibility by allowing easy and efficient design changes to be executed through isolated alteration of desired modules and/or rings that are affected by the changes. The use of rings and modules also decreases the costs associated with such changes, since a minimal amount of the mold or mold system is altered.

The present invention itself, together with further objects and attendant advantages, will be best understood by reference to the following detailed description, taken in conjunction with the accompanying drawing.

Other features, benefits and advantages of the present invention will become apparent from the following description of the invention, when viewed in accordance with the attached drawings and appended claims.

BRIEF DESCRIPTION OF THE DRAWINGS

For a more complete understanding of this invention reference should now be made to embodiments illustrated in greater detail in the accompanying figures and described below by way of examples of the invention wherein.

DETAILED DESCRIPTION

In the following Figures the same reference numerals will be used to refer to the same components. While the present invention is described primarily with respect to the formation of a one-piece integral aircraft fuselage barrel, the present invention may be adapted and applied in various applications. The present invention may be applied in aeronautical applications, nautical applications, railway applications, automotive vehicle applications, and commercial and residential applications. The present invention may be utilized to form multi-piece fuselages. Also, a variety of other embodiments are contemplated having different combinations of the below described features of the present invention, having features other than those described herein, or even lacking one or more of those features. As such, it is understood that the invention can be carried out in various other suitable modes.

In the following description, various operating parameters and components are described for one constructed embodiment. These specific parameters and components are included as examples and are not meant to be limiting.

Referring now to FIGS. 1-4, a perspective view of a one-piece integrally formed aircraft fuselage barrel 10 and perspective sectional views of a portion thereof are shown in accordance with an embodiment of the present invention. The fuselage barrel 10 includes a skin 12, which forms the outer shell of the fuselage barrel 10. The skin 12 may have any number of layers. The fuselage barrel 10 also includes longerons 14, doublers 16, and shear ties 18. The skin 12, longerons 14, doublers 16, and shear ties 18 are integrally formed and are part of a single unit, namely the one-piece fuselage barrel 10. The longerons 14 and the shear ties 18 support the skin 12 and provide rigidity and strength. The doublers 16 are utilized to increase fuselage strength around window and door areas. Although the doublers 16 are shown as surrounding fuselage window openings 20, they may be similarly utilized around doorways or other openings in the fuselage barrel 10.

The longerons 14, which are sometimes referred to as stringers, extend the longitudinal length of the fuselage barrel 10. Although the longerons 14 are shown as being in a "Hat"-configuration, they may be in some other configuration. The longerons 14 protrude inward from the skin 12 and include skin contact members 19, converging members 21, and an inner support member 23. The skin contact members 19 may be integrally formed with the skin 12 or be attached or joined to the skin. The converging members 21 converge inward toward the support member 23. The Hat configuration provides increased rigidity and strength over, for example, "I"-beam type configurations.

Figure 1:
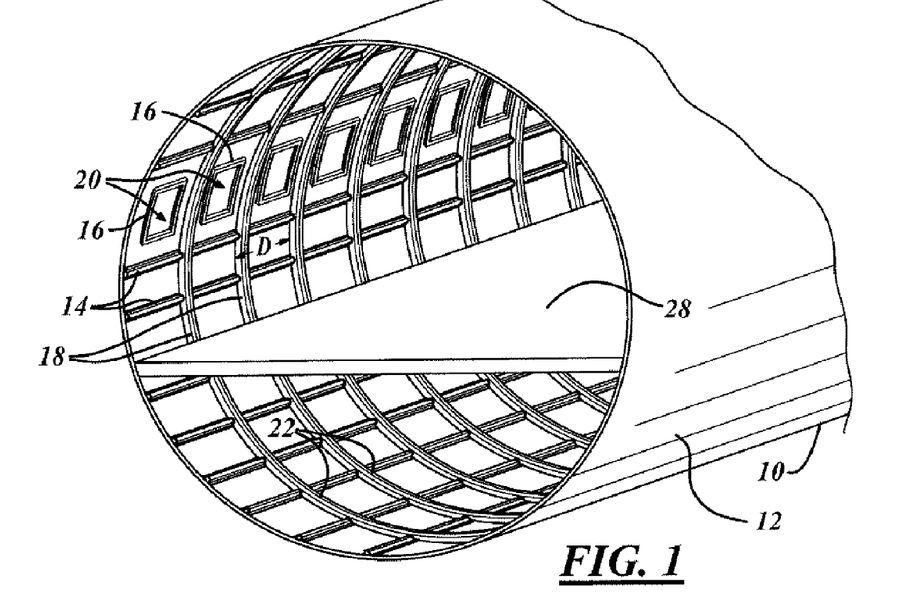
FIG. 1 is a perspective view of a one-piece integrally formed aircraft fuselage barrel in accordance with an embodiment of the present invention.
Figures 2, 3:
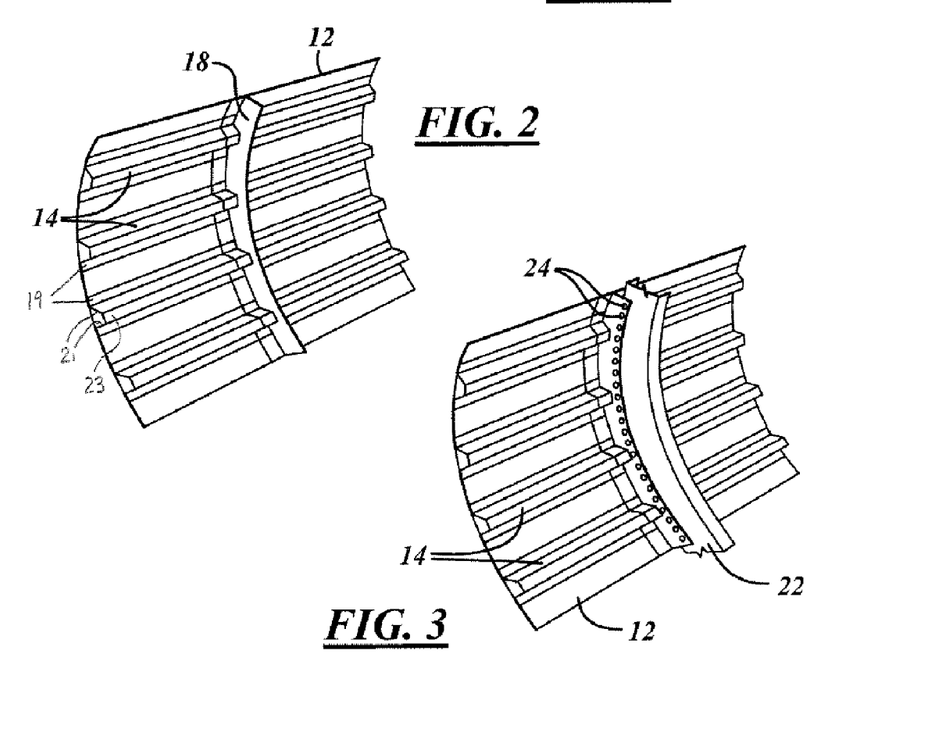
FIG. 2 is a perspective sectional view of a portion of the fuselage barrel of FIG. 1 illustrating the integral one-piece construction thereof.
FIG. 3 is a perspective sectional view of the portion of FIG. 2 coupled to a frame in accordance with an embodiment of the present invention.
Figures 4, 7, 8, 9A, 9B:
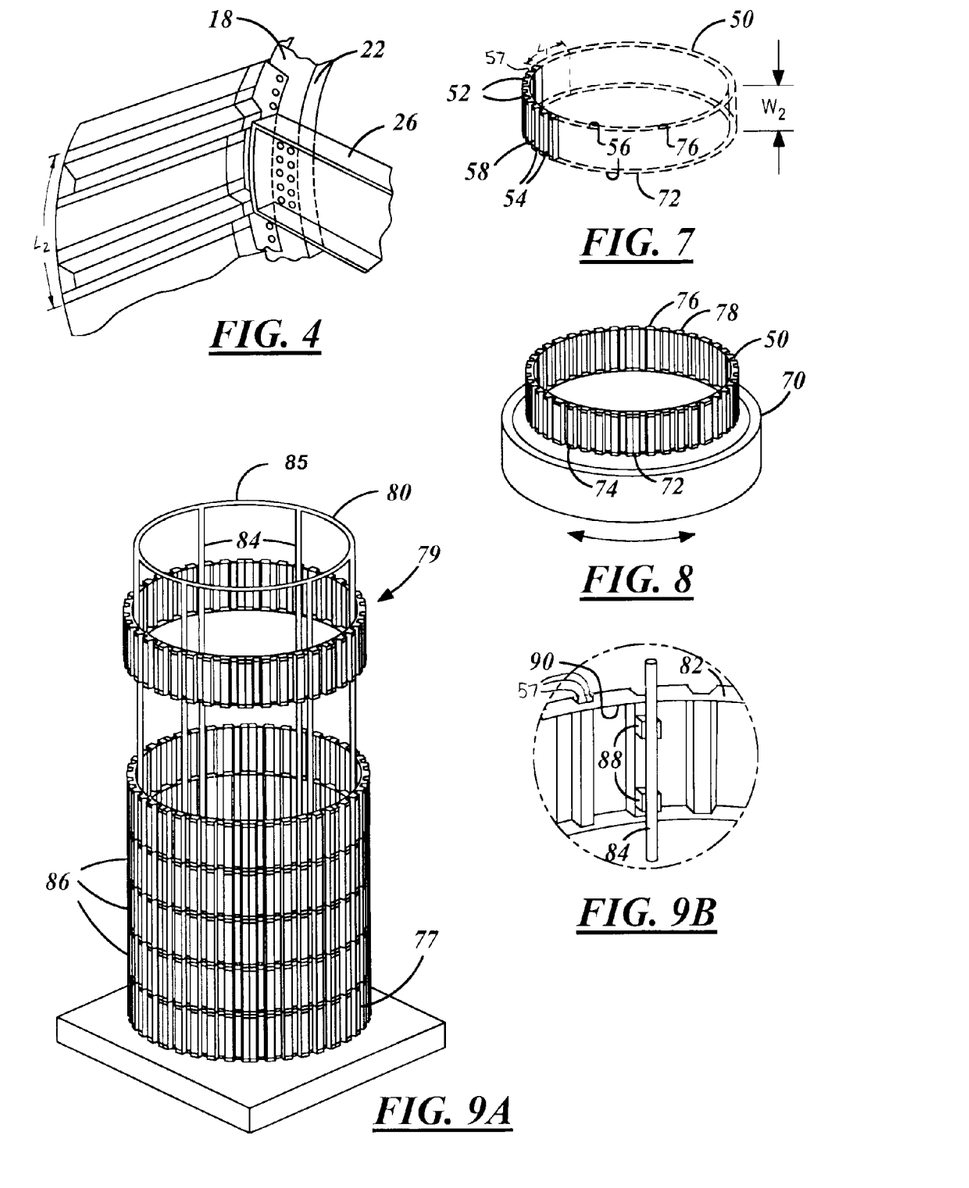
FIG. 4 is a perspective sectional view of the portion of FIG. 2 coupled to a frame and a floor beam in accordance with an embodiment of the present invention.
FIG. 7 is a perspective view of a mold ring in accordance with an embodiment of the present invention.
FIG. 8 is a perspective and diagrammatic view of a mold ring illustrating shear tie material lay-up in accordance with an embodiment of the present invention.
FIG. 9A is a diagrammatic view illustrating a mold assembly on a structural grid in accordance with an embodiment of the present invention.
FIG. 9B is a close-up perspective view of ring module portion of the mold of FIG. 9A illustrating a sample coupling between the module and a support structure.

The shear ties 18 extend circumferentially over the longerons 14. Distance D between the shear ties 18 is shown. The shear ties 18 are in a parallel configuration and are at predetermined longitudinal intervals within the skin 12. The shear ties are configured for frame coupling thereto. Frames 22 are aligned with and fastened to the shear ties 18, for example, via rivets 24 or by other techniques known in the art. The shear ties 18 extend inward between longitudinally adjacent longerons 14 away from the skin 12 for such frame coupling. The separation distances between the frames 22 are also approximately equal to the distance D, without accounting for frame thicknesses. The frames 22 provide circumferential support for the fuselage barrel 10.

Floor beams 26 may be coupled to the frames 22 to support a floor, such as a main cabin floor 28. The floor beams 26 may be riveted to the frames 22, as shown, attached via fasteners, or attached via some other technique known in the art.

The skin 12, longerons 14, doublers 16, and shear ties 18 are formed of a composite material, such as that of a material combination of epoxy resin and carbon fiber. Of course, other composite materials may be utilized.

Figures 5, 13:
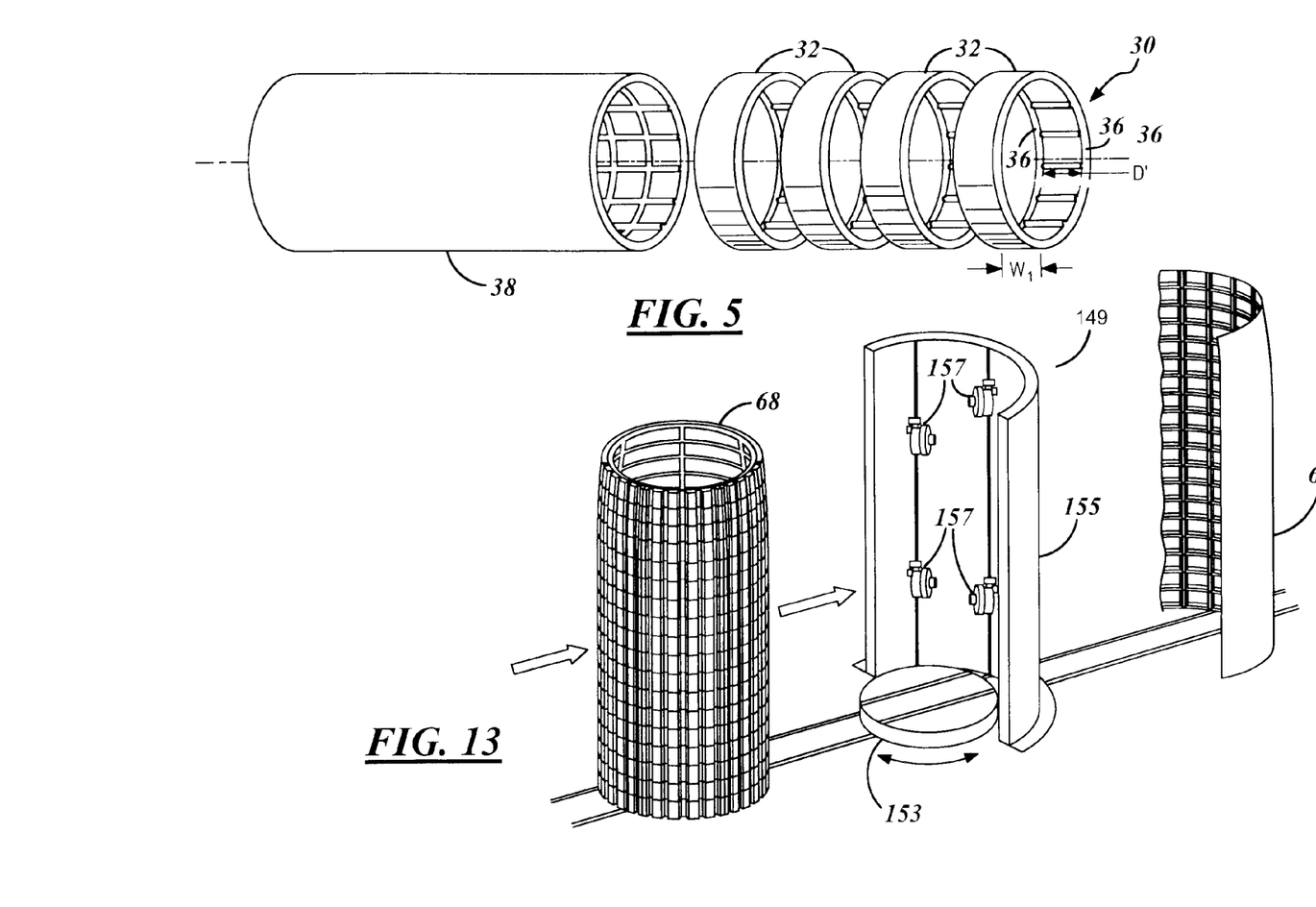
FIG. 5 is a perspective and diagrammatic view of a fuselage barrel illustrating fuselage length variation in accordance with an embodiment of the present invention.
FIG. 13 is a diagrammatic view illustrating vertical skin lay-up in accordance with another embodiment of the present invention.

Referring now to FIG. 5, a perspective and diagrammatic view of a fuselage barrel 30 illustrating fuselage barrel length variation in accordance with an embodiment of the present invention is shown. Multiple fuselage barrels of different length may be formed utilizing a single mold system, such as that described in detail with respect to FIGS. 7-11 below. The number of mold rings utilized within the mold system, dictates the length of the fuselage barrel formed. Multiple fuselage ring-formed portions 32 are shown, which correspond with associated mold rings. The width $W_1$ of the portions 32 is approximately equal to the distance D' between the shear ties 36. Each additional ring formed portion extends the fuselage barrel 30 by the width $W_1$.

A short or standard size fuselage barrel, such as the section of the fuselage barrel 30 which is marked 38 may be formed from a one-piece mold and longer fuselage barrels, such as the fuselage barrel 30 may be formed from an extended mold formed through attachment of ring molds to that one-piece mold. Of course, the fuselage barrel 30 may be formed from a mold constructed entirely of mold rings, as illustrated and described with respect to the embodiments of FIGS. 6-14.

Figure 6:
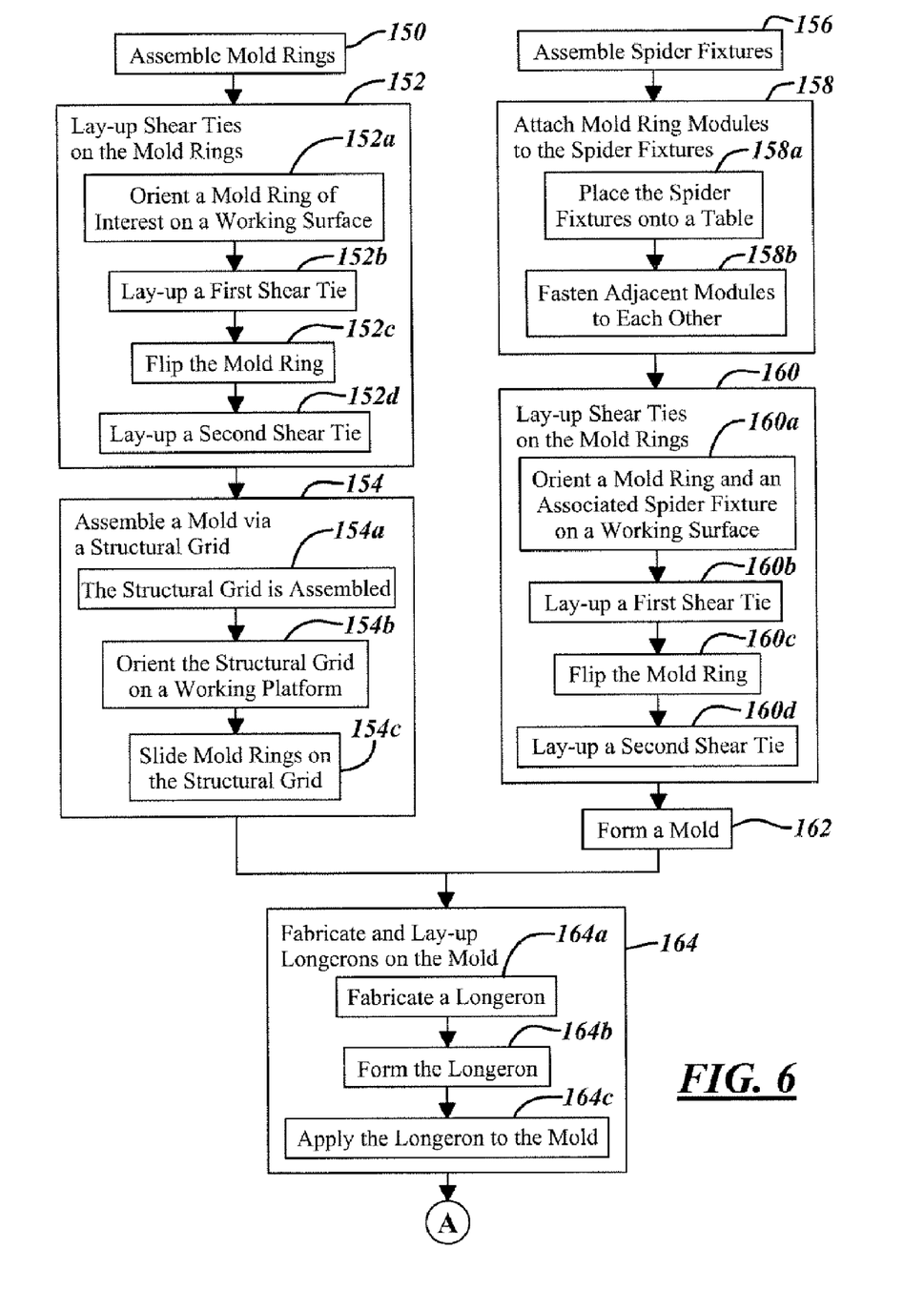
FIG. 6 is a logic flow diagram illustrating a method of forming a one-piece integral aircraft fuselage barrel in accordance with an embodiment of the present invention.
Figure 12:
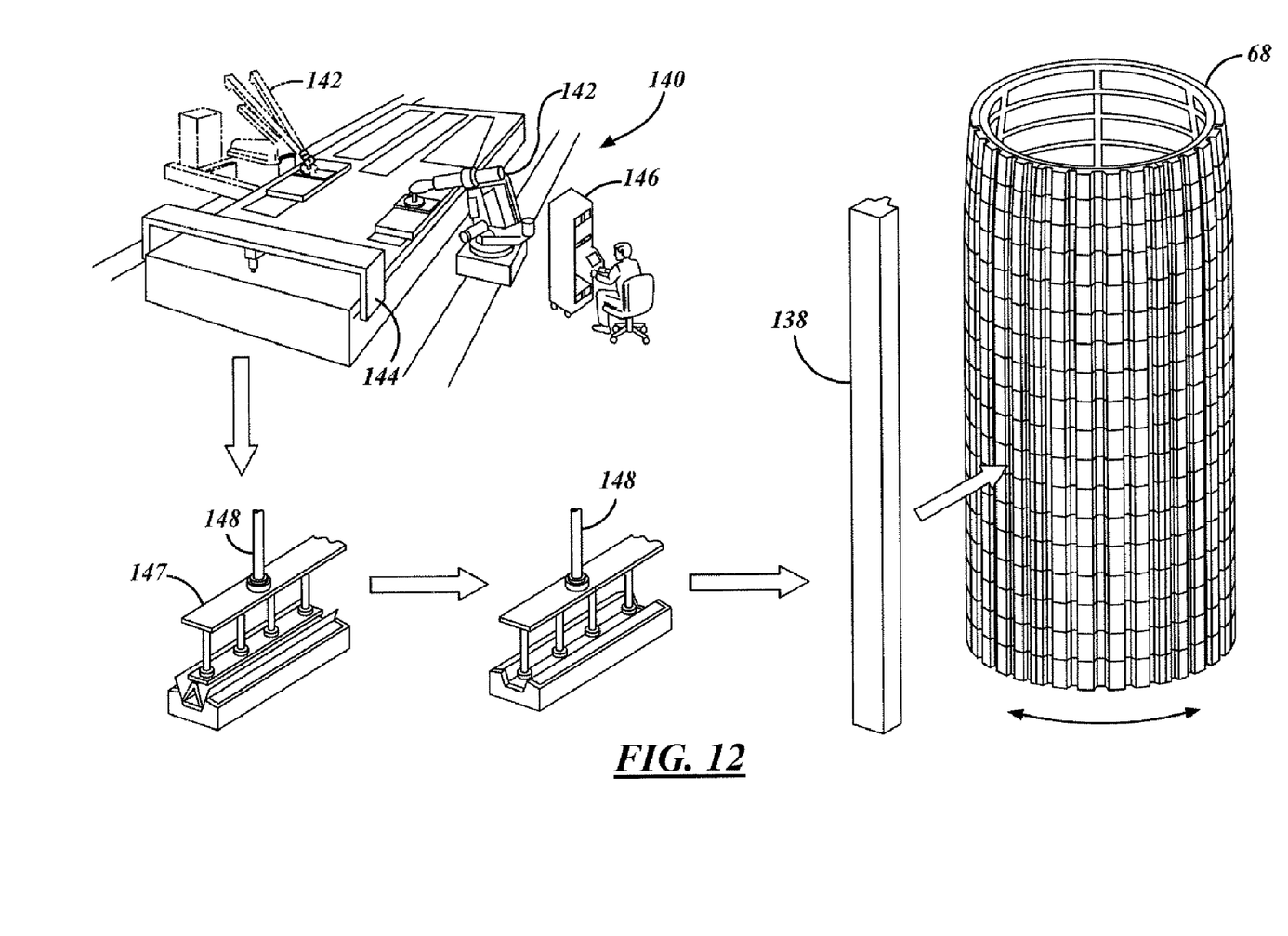
FIG. 12 is a diagrammatic view illustrating longeron fabrication and lay-up in accordance with another embodiment of the present invention.
Figure 14:
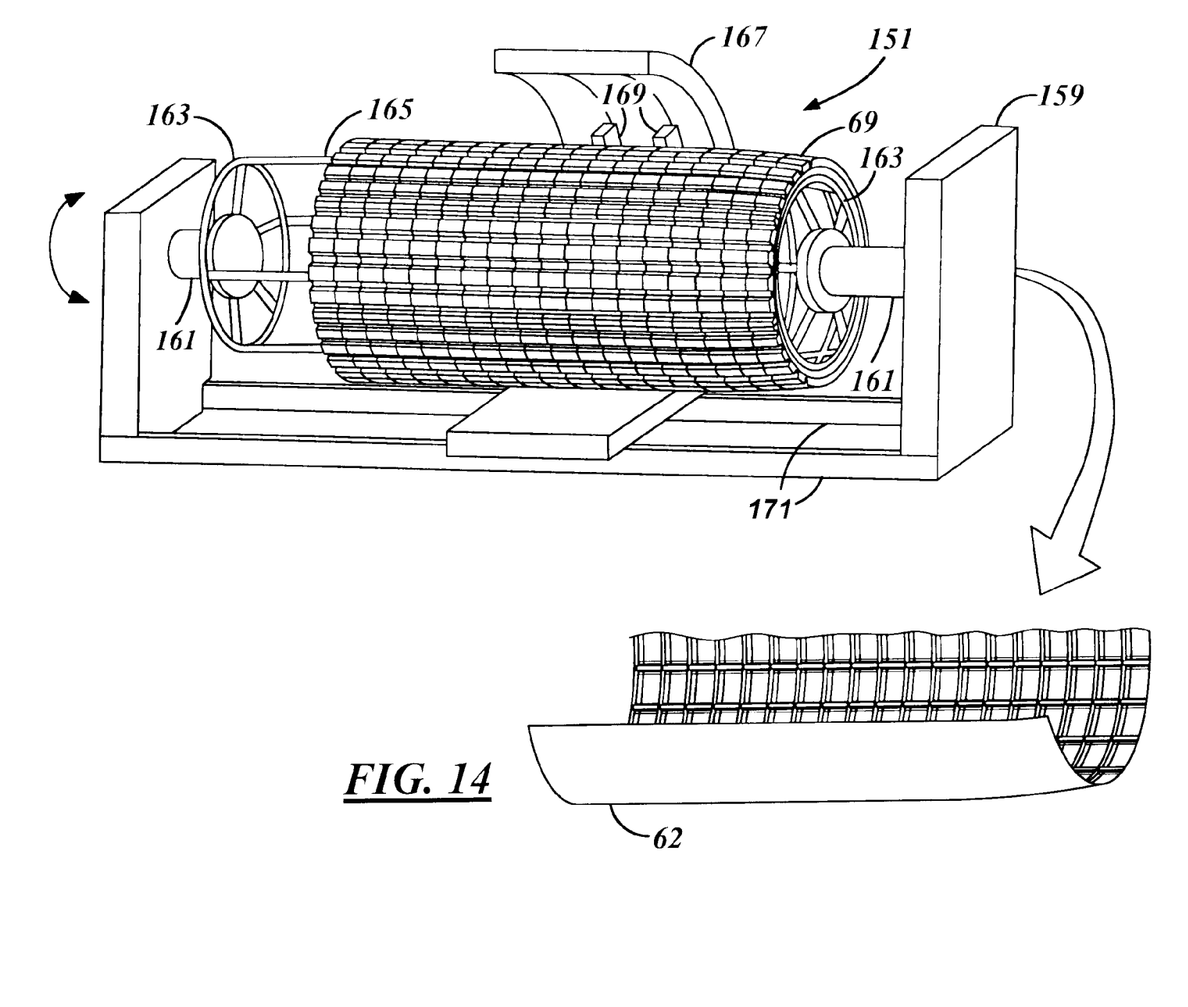
FIG. 14 is a diagrammatic view illustrating horizontal skin lay-up in accordance with another embodiment of the present invention.

Referring now to FIG. 6, a logic flow diagram illustrating a method of forming a one-piece integral aircraft fuselage barrel in accordance with an embodiment of the present invention is shown. The fuselage barrel is formed over a mold, which is formed from multiple mold rings, as shown in FIGS. 9A and 11-13 and described in steps 150-162. Each mold ring bridges the fuselage barrel axial span between two adjacent shear ties. FIGS. 7-11 illustrate the mold rings and formation of the mold, which is described in steps 150-162. FIGS. 12-14 illustrate formation of the fuselage barrel on the mold, which is described in steps 164-166. In steps 168-174 the fuselage barrel is cured and separated from the mold rings and frames and floor beams are attached.

Referring now to FIG. 7, a perspective view of a sample mold ring 50 in accordance with an embodiment of the present invention is shown. The mold ring 50 has width $W_2$, which is approximately equal to the separation distance between two adjacent frames, such as the separation distance D. The mold ring 50 includes multiple modules 52, which are coupled to each other. Each module 52 has an outer fuselage-forming surface 53 with two or more longitudinal grooves 54. The modules 52 have circumferential length $L_1$ that is greater than or equal to the overall circumferential length $L_2$ covered by the spacing of two longerons and thus greater than the circumferential distance between two longerons. In the example embodiment shown, the circumferential length $L_1$ is greater than the overall circumferential length covered by the spacing of three longerons or corresponding module grooves 54. The overall length $L_2$ can best be seen in FIG. 4. Although any number of modules may be used to form a single mold ring, the use of three or more modules provides increased ease in post-forming extraction of the modules.

The grooves 54 are used for insertion and lay-up of the longerons 14. The grooves 54 are shown for example purposes and correspond to the Hat configurations of the longerons 14. The grooves 54 have inner surfaces 57 that have similar dimensions to the longerons 14. Of course, the grooves may be shaped differently, used in conjunction with other intrusions or protrusions, or may not be used depending upon the application. The longitudinal grooves 54 reside on an exterior side 58 of the modules 52 and may vary in size and shape depending upon the application. The modules also include circumferential edges 56 for the lay-up of the shear ties 18. The modules 52 may be formed of stainless steel, aluminum, invar, composite material, some other suitable material, or combination thereof.

The composite material utilized to form the modules 52 may be similar to the composite material used to form a fuselage barrel, such as fuselage barrels 60 and 62 in FIGS. 13 and 14. However, the number of layers applied, the orientation of the fibers, and other composite layer parameters of the modules 52 and the formed fuselage barrel may be different. The parameter differences between the composite materials used to form the modules 52 and that used to form the fuselage barrel aid in preventing shape alteration of the modules 52, adherence between the modules 52 and the fuselage barrel, and other related and undesirable characteristics and/or effects during formation and curing of the fuselage barrel.

Figures 10A, 10B, 11:
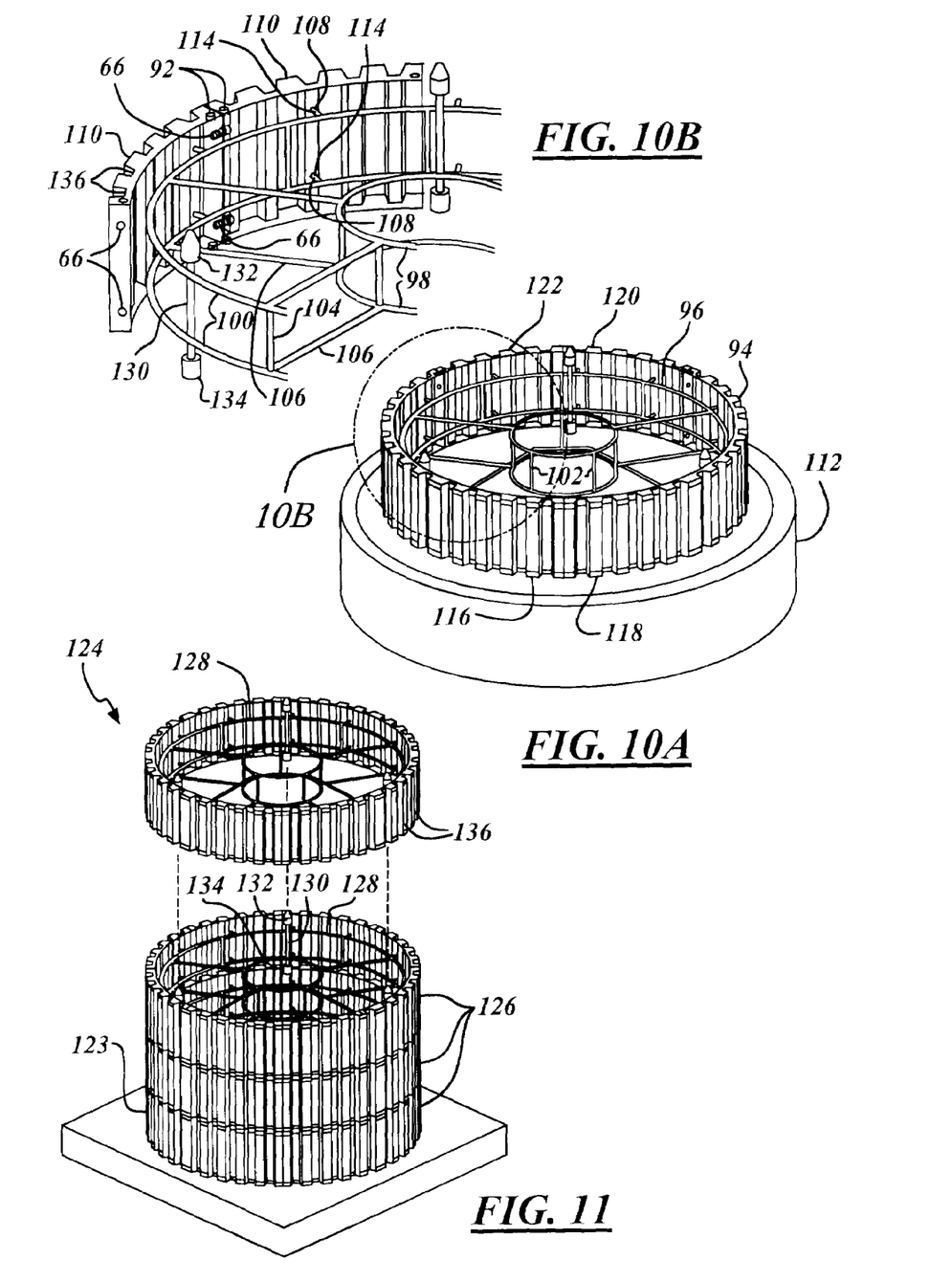
FIG. 10A is a perspective and diagrammatic view of a mold ring illustrating shear tie material lay-up in accordance with another embodiment of the present invention.
FIG. 10B is a close-up perspective view of a spider fixture support structure for a mold ring in accordance with another embodiment of the present invention.
FIG. 11 is a diagrammatic view illustrating mold assembly utilizing the spider fixture support structure of FIGS. 10A-B in accordance with another embodiment of the present invention.

Referring again to FIG. 6, in step 150, the mold rings, such as the mold ring 50, are assembled. The modules 52 are coupled or joined to each other via fasteners, clamps, or other attachment mechanisms (not shown). Fasteners may extend through holes in the modules 52, sample holes 66 for such extension are shown in FIG. 10B.

Referring now also to FIG. 8, a perspective and diagrammatic view of the mold ring 50 illustrating shear tie material lay-up in accordance with an embodiment of the present invention is shown. In step 152, the shear ties are laid-up onto the mold rings prior to assembly of a fuselage mold, such as one of the molds 68 or 69 shown in FIGS. 12-14. In step 152*a*, a mold ring, such as the mold ring 50, is placed on to a working surface, such as the rotating table 70 as shown. In step 152*b*, a first shear tie 72 is laid-up on a first circumferential edge 74 of the mold ring. In step 152*c*, the mold ring is flipped 180°. In step 152*d*, a second shear tie 76 is laid-up on a second circumferential edge 78 of the mold ring. The shear ties are laid-up using techniques known in the art. Steps 152*c* and 152*d* when performed, are performed solely for the first mold ring, such as the mold ring 77, unless otherwise desired.

Referring now also to FIGS. 9A-B, a diagrammatic view illustrating a multi-ring system or mold assembly 79 on a support structure or structural grid 80 and a close-up perspective view of a ring module portion 82 in accordance with an embodiment of the present invention are shown. In step 154, the mold is assembled using the structural grid 80. The mold may be assembled in a vertical or horizontal fashion. FIGS. 9A and 11 provide two vertical formation examples in which a mold is stacked on a platform.

In step 154*a*, the structural grid 80 is assembled or constructed. The structural grid 80 may be formed of rods, as shown in FIGS. 9A-11. In the embodiment of FIG. 9A, the support structure 80 includes multiple longitudinal rods 84 and two or more circumferential rods 85 (only one is shown). The longitudinal rods 84 may be welded or attached via some other mechanism to the circumferential rods 85. In step 154*b*, the structural grid 80 is oriented onto a working platform. In step 154*c*, each mold ring 86 is slid onto the structural grid 80. The mold rings 86 may have slide clips 88, which guide the rings 86 on and attach the rings 86 to the longitudinal rods 84. The slide clips 88 are attached to the inner surface 90 of the mold rings 86 and are generally "U"-shaped. The slide clips 88 are provided as one example, other guides and attachment mechanisms may be utilized. As each mold ring 86 is slid into place it is fastened to any adjacent mold ring(s). Ring edge holes 92 are shown in FIG. 10B in which fasteners may extend therethrough and couple adjacent mold rings.

As another example and alternative to steps 150-154, steps 156-162 may be performed. Note that in step 154, a single unitary structural grid is used, whereas, in steps 156-162 multiple "spider" fixtures are utilized. Each spider fixture is associated with a particular mold ring.

Referring now to FIG. 6 and also to FIGS. 10A-B in which a perspective and diagrammatic view of a mold ring 94 and a close-up perspective view of a spider fixture support structure 96 are shown in accordance with another embodiment of the present invention. In step 156, the spider fixtures are assembled or constructed. Similar to the structural grid 80 the spider fixtures are formed of rods. Each of the spider fixtures has an associated set of rods, which may be welded to each other or attached by some other technique known in the art. The rods of the sample spider fixture 96 shown include a pair of inner loops 98 and a pair of outer loops 100. The inner loops 98 are laterally placed and attached to each other via a first set of cross-members 102. Likewise, the outer loops 100 are laterally placed and attached to each other via a second set of cross-members 104. The inner loops 98 are attached to the outer loops 100 via radial members 106. In addition, ring-mounting pegs 108 are attached to the outer loops 100 and extend radially outward for mold ring attachment thereon.

In step 158, mold ring modules, such as the modules 110, are attached to the spider fixtures and assembled. In step 158a, each spider fixture may be placed onto a rotating table, such as the table 112 shown in FIG. 10A, whereon the modules may be attached to the fixture. The modules may also include insert holes, such as fixture peg holes 114, for receiving the ring-mountain pegs 108. The modules may be attached to the spider fixtures using an attachment mechanism other than the pegs 108. In step 158b, the modules are fastened to each other to maintain alignment therebetween, similarly as described above in step 150.

In step 160, shear ties are laid-up onto the mold rings, similarly as performed in step 152 above. In step 160a, the mold ring 94 and associated spider fixture 96 are placed on to a working surface, such as the rotating table 112. In step 160b, a first shear tie 116 is laid-up on a first circumferential edge 118 of the mold ring. In step 160c, the mold ring 94 and the spider fixture 96 are flipped 180°. In step 160d, a second shear tie 120 is laid-up on a second circumferential edge 122 of the mold ring 94. As with steps 152c and 152d, steps 160c and 160d are performed for the first mold ring 123.

Referring now also to FIG. 11, a diagrammatic view illustrating a multi-ring system or mold assembly 124 utilizing spider fixture support structures in accordance with another embodiment of the present invention is shown. In step 162, the mold assembly 124 is formed. The mold rings 126 and associated spider fixtures 128 are aligned and coupled to each other. A first mold ring, such as the mold ring 123, may be placed on a working surface and each additional mold ring may be stacked thereon.

The mold rings 126 and spider fixtures 128 may include alignment devices 130 with ring segment cones 132 and ring segment bushings or locks 134. The alignment mechanisms 130 may be attached directly to the mold rings 126 or the spider fixtures 128. Although in the embodiment shown, each mold ring and spider fixture combination includes three alignment mechanisms, any number of alignment mechanisms may be utilized. The ring segment locks are positioned over and are configured for the insertion of adjacent ring segment cones therein, such as that on a separate and adjacent mold ring and spider fixture combination. This insertion of the cones 132 into the locks 134 positions the mold rings 126 for alignment of the longeron grooves 136 and provides a lateral locking mechanism. The lateral locking mechanism prevents radial sliding or shifting between the mold rings 126.

The above described support structures 80 and 128 of FIGS. 9A-11 are for example purposes only, other support structures may be utilized. The support structures 80 and 128 may consist of rod configurations other than that shown. The support structures 80 and 128 may be of various sizes and formed of various materials known in the art.

Referring now to FIG. 6 and to FIG. 12 in which a diagrammatic view illustrating longeron fabrication and lay-up in accordance with another embodiment of the present invention is shown. In step 164, longerons, such as the longeron 138, are fabricated and laid-up onto a mold, such as the mold 68 or the mold 69. In step 164a, the longerons are fabricated. The longerons may be formed and cut using a numerically controlled prepreg cutting system 140 or other known numerically controlled system or the like. The numerically controlled system includes robotic placement devices 142, a numerically controlled cutter 144, and a control station 146. In step 164b, the longerons may be formed using a press with an end effector, such as the press 147 and the end effector 148. Various end effectors may be used having various sizes, shapes, and styles. In step 164c, the longerons may be removed from the press, using the end effector, and transferred and applied to the mold. Although not shown, the mold may be located on a rotating table and rotated for placement of the longerons within longeron grooves.

Referring now to FIG. 6 and to FIGS. 13 and 14 in which diagrammatic views illustrating vertical and horizontal skin lay-ups in accordance with other embodiments of the present invention are shown. In step 166, the skin and the doublers (although not shown) of a fuselage barrel, such as fuselage barrel 60, are laid-up. The skin and doublers are laid-up onto a mold, such as the mold 68 or the mold 69. The mold and the correspond support structure are positioned within a vertical lay-up station 149 or on a horizontal lay-up station 151, as shown in FIGS. 13 and 14, respectively. The vertical lay-up station 149 includes a rotating platform 153 and a machine structure 155 with material lay-up heads 157. The mold is rotated on the platform while the lay-up heads 157, which may translate in a vertical direction, apply material onto the mold to form the skin and the doublers.

The horizontal lay-up station 151 includes a mounting stand 159 having a pair of rotating spindles 161. The spindles 161 have associated rotors 163 in which a support structure, such as the structure 165, is positioned between and attached thereto. The horizontal station 151 also includes a machine structure 167 with multiple material application heads 169. The machine structure 167 is configured to arch around and over a portion of the mold. The machine structure 167 resides on rails 171, which allow the machine structure 167 to be laterally displaced along the mold. Motors (not shown) may be used for rotation of the mold, for translation of the machine structure 167, for translation of the multiple material application heads 169, and to control the lay-up process.

In step 168, the fuselage barrel, such as one of the fuselage barrels 60 or 62 is co-cured. The fuselage barrel may be cured on the associated mold using techniques known in the art. As an example, to cure the fuselage barrel, the mold including the laid-up fuselage barrel may be placed under vacuum within an autoclave and heated. Pressure may be applied on the fuselage barrel within the autoclave to assist in the curing and forming process.

In step 170, the support structure, such as the support structure 80 or 128, is decoupled and removed from the mold. In step 172, the mold rings are decoupled and removed from the fuselage barrel. Each mold ring may be removed from the mold as a single unit or the modules thereof may be decoupled and removed separately.

In step 174, frames and floor beams, such as frames 22 and floor beams 26, may be coupled to the shear ties of the fuselage barrel. The frames may, for example, be riveted to the shear ties and the floor beams may be riveted to the frames, as shown in FIGS. 3 and 4.

The above-described steps are meant to be illustrative examples; the steps may be performed sequentially, synchronously, simultaneously, or in a different order depending upon the application.

The present invention provides a system and method for the formation of a one-piece integral aircraft fuselage barrel. The present invention utilizes a fuselage barrel mold that has multiple mold rings and corresponding modules, which are easy to manipulate, handle, and remove from a fuselage barrel. This technique allows for quick and easy design changes and facilitates the fuselage manufacturing process. The present invention reduces operating and maintenance costs. Operating costs include fabricating costs, costs associated with manufacturing time, and tooling costs. Several fuselage barrel derivatives or fuselage barrels having different length can be produced using the same tool or fuselage barrel mold. Maintenance costs are reduced due to the ability to maintain, modify, and replace small portion of the tool. The present invention also reduces fuselage tooling costs and tooling modification costs.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A system comprising:
    an aircraft fuselage barrel comprising a plurality of fuselage frames and a plurality of fuselage longerons; and
    a forming system for forming said aircraft fuselage barrel, comprising:
        a mold comprising at least one mold ring, said mold ring having width approximately equal to a separation distance between two adjacent members of said plurality of fuselage frames and comprising at least one module having circumferential length greater than a circumferential distance between two adjacent members of said plurality of fuselage longerons; and at least one support structure coupled to and supporting said mold.

2. A system as in claim 1 wherein said mold comprises a plurality of mold rings coupled to each other.

3. A system as in claim 2 further comprising a plurality of alignment devices, aligning said plurality of mold rings relative to each other.

4. A system as in claim 3 wherein said plurality of alignment devices are directly coupled to said plurality of mold rings.

5. A system as in claim 3 wherein said plurality of alignment devices are directly coupled to said at least one support structure.

6. A system as in claim 2 wherein said at least one support structure comprises a plurality of rods that reside within and extend across said plurality of mold rings.

7. A system as in claim 6 further comprising a plurality of fasteners coupling said plurality of mold rings to said plurality of rods.

8. A system as in claim 6 wherein said plurality of rods form a structural grid.

9. A system as in claim 1 wherein said at least one support structure comprises: a first set of rods that reside within, are coupled to, and are associated with a first mold ring; and a second set of rods that reside within, are coupled to, and are associated with a second mold ring.

10. A system as in claim 1 wherein said at least one support structure comprises a plurality of rods, which reside within and are coupled to said at least one mold ring.

11. A system as in claim 10 wherein said plurality of rods form a spider fixture.

12. A system as in claim 1 wherein said at least one mold ring comprises a plurality of modules.

13. A system as in claim 12 wherein each of said plurality of modules is semi-circular and comprises an outer fuselage-forming surface having longeron shaped grooves.

14. A system as in claim 1 wherein said at least one mold ring comprises at least one groove for formation of at least one fuselage component selected from a longeron, a doubler, and a shear tie.

15. A system as in claim 14 wherein said at least one groove extends along an outer edge of said at least one mold ring.

16. A system as in claim 14 wherein said at least one groove extends between ring coupling edges of said at least one mold ring.

* * * * *